(12) United States Patent
Reicher et al.

(10) Patent No.: US 11,055,204 B2
(45) Date of Patent: Jul. 6, 2021

(54) AUTOMATED SOFTWARE TESTING USING SIMULATED USER PERSONAS

(71) Applicant: INTERNATIONAL BUSINESS MACHINES CORPORATION, Armonk, NY (US)

(72) Inventors: Murray A. Reicher, Rancho Santa Fe, CA (US); Puja Gupta, San Diego, CA (US); Sun Young Park, San Diego, CA (US); Dustin Michael Sargent, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/573,626

(22) Filed: Sep. 17, 2019

(65) Prior Publication Data

US 2021/0081302 A1   Mar. 18, 2021

(51) Int. Cl.
*G06F 9/44* (2018.01)
*G06F 11/36* (2006.01)
*G06F 11/30* (2006.01)
*G06N 3/04* (2006.01)
(Continued)

(52) U.S. Cl.
CPC ........ *G06F 11/3664* (2013.01); *G06F 11/302* (2013.01); *G06F 11/3438* (2013.01); *G06F 11/3684* (2013.01); *G06F 11/3688* (2013.01); *G06F 11/3692* (2013.01); *G06N 3/0445* (2013.01); *G06N 3/0454* (2013.01); *G06N 3/08* (2013.01)

(58) Field of Classification Search
CPC .............. G06F 11/302; G06F 11/3438; G06F 11/3664; G06F 11/3684; G06F 11/3688; G06F 11/3692; G06N 3/0445; G06N 3/0454; G06N 3/08

USPC .................................. 717/104–107, 124–135
See application file for complete search history.

(56) References Cited

U.S. PATENT DOCUMENTS

| 8,489,407 | B2 | 7/2013 | Bradley et al. |
| 9,009,653 | B2 | 4/2015 | Padmalata et al. |
| 2009/0178021 | A1 | 7/2009 | Alluri |

(Continued)

FOREIGN PATENT DOCUMENTS

WO   2018206504 A1   11/2018

OTHER PUBLICATIONS

Chu et al., "Learning Personas from Dialogue with Attentive Memory Networks", 2018, Proceedings of the 2018 Conference on Empirical Methods in Natural Language Processing, pp. 2638-2646. (Year: 2018).*

(Continued)

*Primary Examiner* — Ted T. Vo
(74) *Attorney, Agent, or Firm* — Konrad Raynes Davda & Victor LLP; Janaki K. Davda

(57) ABSTRACT

Provided are techniques for automated software testing using simulated user personas. A request to test software is received. Job roles, user software activities for the software to be tested, and objectives are automatically identified using a first machine learning model. A test operation sequence using the job roles, the user software activities, and the objectives to test the software is generated using a second machine learning model. The test operation sequence is executed to simulate different users having different job roles using the software with the user software activities to achieve the objectives.

18 Claims, 7 Drawing Sheets

(51) Int. Cl.
*G06F 11/34* (2006.01)
*G06N 3/08* (2006.01)

(56) References Cited

U.S. PATENT DOCUMENTS

| | | |
|---|---|---|
| 2014/0172512 A1 | 6/2014 | Chandra et al. |
| 2019/0034976 A1* | 1/2019 | Hamedi ............. G06Q 30/0204 |
| 2019/0087730 A1 | 3/2019 | Saito |
| 2019/0122092 A1* | 4/2019 | Haines ................ G06F 11/3452 |
| 2019/0122146 A1* | 4/2019 | Meadows ........... G06F 11/3024 |
| 2020/0019488 A1* | 1/2020 | Singh .................. G06F 11/3688 |
| 2020/0098353 A1* | 3/2020 | Olabiyi .................. G06F 40/30 |

OTHER PUBLICATIONS

Perera, "Persona Based Testing", 2017, Retrieved from https://medium.com/@ChamalAsela/persona-based-testing-de6e1396c23c, 5 pages (Year: 2017).*

Mell et al., "Effectively and Securely Using the Cloud Computing Paradigm" dated Oct. 7, 2009, NIST, Information Technology Laboratory, Total 80 pages.

Mell et al., "The NIST Definition of Cloud Computing" dated Sep. 2011, Recommendations of the National Institute of Standards and Technology, Total 7 pages.

Wikipedia, "Generative Adversarial Network", [online], Last Edited Sep. 1, 2019 [Retrieved on Sep. 1, 2019], Retrieved from the Internet at <URL: https://en.wikipedia.org/wiki/Generative_adversarial_network>, 8 pp.

Wikipedia, "Recurrent Neural Network", [online], Last Edited Aug. 27, 2019 [Retrieved on Sep. 1, 2019], Retrieved from the Internet at <URL: https://en.wikipedia.org/wiki/Recurrent_neural_network>, 17 pp.

* cited by examiner

AUTOMATED SOFTWARE TESTING USING SIMULATED USER PERSONAS

BACKGROUND

1. Field of the Invention

Embodiments of the invention relate to automated software testing using simulated user personas.

2. Description of the Related Art

With software development and quality testing, identification and documentation of user requirements may have errors of omission due to imperfect understanding of how users interact with software. Also, for different software, and for each released version of a given software, a test plan is created and executed, which may be a costly and time consuming process. Moreover, testing is often biased in reflecting ideal workflows rather than all possible user workflows.

Software development and quality testing may be more difficult with enterprise software, where there may be many simultaneous users with different job roles and levels of experience.

SUMMARY

In accordance with embodiments, a computer-implemented method is provided for automated software testing using simulated user personas. The computer-implemented method comprises operations. A request to test software is received. Job roles, user software activities for the software to be tested, and objectives are automatically identified using a first machine learning model. A test operation sequence using the job roles, the user software activities, and the objectives to test the software is generated using a second machine learning model. The test operation sequence is executed to simulate different users having different job roles using the software with the user software activities to achieve the objectives.

In accordance with other embodiments, a computer program product is provided for automated software testing using simulated user personas. The computer program product comprises a computer readable storage medium having program code embodied therewith, the program code executable by at least one processor to perform operations. A request to test software is received. Job roles, user software activities for the software to be tested, and objectives are automatically identified using a first machine learning model. A test operation sequence using the job roles, the user software activities, and the objectives to test the software is generated using a second machine learning model. The test operation sequence is executed to simulate different users having different job roles using the software with the user software activities to achieve the objectives.

In yet other embodiments, a computer system is provided for automated software testing using simulated user personas. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A request to test software is received. Job roles, user software activities for the software to be tested, and objectives are automatically identified using a first machine learning model. A test operation sequence using the job roles, the user software activities, and the objectives to test the software is generated using a second machine learning model. The test operation sequence is executed to simulate different users having different job roles using the software with the user software activities to achieve the objectives.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments intelligently simulate real users based on the work that the users intend to accomplish ("objectives", "goals" or "intended accomplishments") to improve identification of software requirements and completion of automated software testing ("quality testing"). Software may also be referred to as a software application or computer program.

Figure 1:
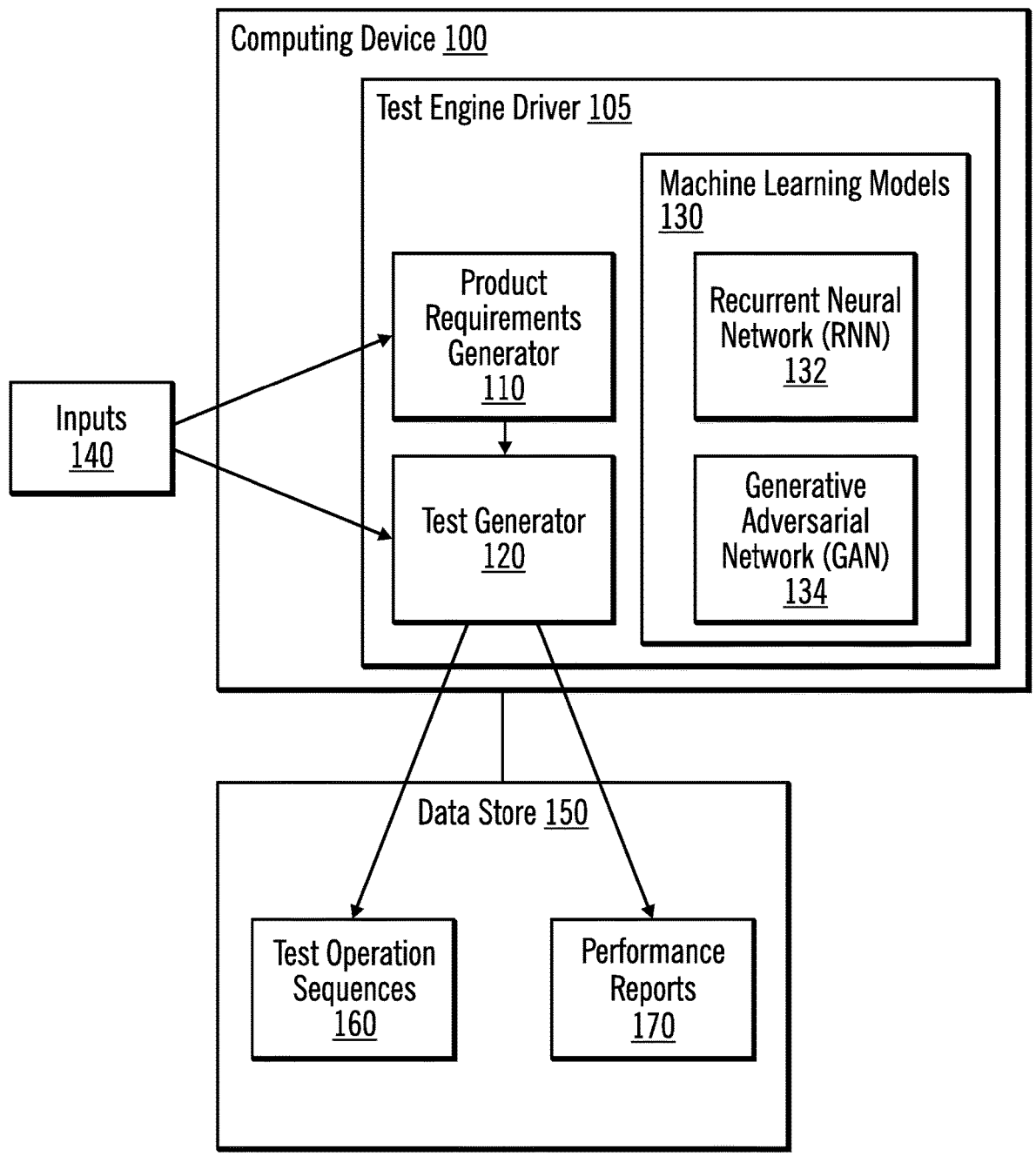
FIG. 1 illustrates, in a block diagram, a computing environment in accordance with certain embodiments.

FIG. 1 illustrates, in a block diagram, a computing environment in accordance with certain embodiments. A computing device 100 includes a test engine driver 105. The test engine driver 105 includes a product requirements generator 110 and a test generator 120. The test engine driver 105 may also use machine learning models 130, such as a Recurrent Neural Network (RNN) model 132 and a Generative Adversarial Network (GAN) 134.

The test generator 120 may receive information via input 140 (e.g., manually from a user) or may receive information automatically generated by the product requirements generator 110. The information includes job roles ("user roles" or "type of users"), user software activities ("sequences of user actions"), and objectives. In certain embodiments, the input 140 includes a description (e.g., a workbook) of job roles, user software activities, and objectives. In certain embodiments, the product requirements generator 110 tracks user software activity (e.g., executing software, entering data into a software user interface, etc.) or processes user software activity logs and classifies the user software activity based on objectives and job roles using Artificial Intelligence (AI) (e.g., using the RN 132).

The computing device 100 is coupled to a data store 150. The data store 150 may store test operation sequences 160 ("test sequences") and may store performance reports 170. The test generator 120 outputs the test operation sequences 160 and the performance reports 170. The test generator 120 generates test plans and executes tests based on an understanding of objectives per each job role. In certain embodiments, the test operation sequences 160 may be workflows. In additional embodiments, the test operation sequences may be test scripts that are executed by a computer.

The test engine driver 105, with the product requirements generator 110 and the test generator 120, may be described as a computerized simulator that determines and then mimics various job roles based on objectives of each job role (i.e., mimics user personas). In certain embodiments, this is done by using AI, along with user tracking and optional expert input, to understand and classify the users' objectives per job role and levels of expertise and/or experience. The test engine driver 105 classifies objectives behind each user's activities. Using this information, the test engine driver 150 learns what a user is trying to accomplish (i.e., the objectives), as well as the association between the objectives and user software activities. With embodiments, user software activities are actions taken by a user who is using software (e.g., starting a workflow, adding information, requesting a search, etc.), while computer software activities are actions performed by the software (e.g., executing the workflow, storing information, responding to the search, etc.).

The product requirements generator 110 of the test engine driver 105 may be used to translate the tracked user software activities into objectives in order to better understand product requirements. The test generator 120 of the test engine driver 105 may be used to automate creation of test operation sequences (e.g., test plans and procedures), as well as to automate software testing and Quality Assurance (QA) reporting via performance reports.

For example, a software manufacturer may receive a list of the various job roles, levels, and associated objectives that have been previously determined. The software manufacturer may be asked to provide, for each software feature, a list of the objectives associated with each feature. Alternatively, the product requirements generator 110 may monitor the real world use of the software and/or examine user software activity logs and the code base to complete such a classification of objectives. In either case, the test generator 120 may then use simulated job roles to test the software intelligently without requiring a specific test plan.

The product requirements generator 110 uses AI to group and classify tracked user software activities based on the user's objectives (e.g., using an RNN model). In certain embodiments, the product requirements generator 110 includes a classifier, and the classifier learns which user software activities or groups of user software activities are associated with which objectives per job role.

By classifying captured data (e.g., from the user software activity logs, such as timestamps when particular buttons were selected or fields received input) and test operation sequences from different customer locations, the product requirements generator 110 creates an objective/activity classification from which user requirements per job role may be derived.

For example, objectives for a senior radiologist may include: (1) accessing a worklist, (2) viewing images, (3) comparing images, (4) viewing clinical information, (5) marking lesions, (6) creating a clinical report, (7) interrupting a workflow to view another exam in progress and consult with a technologist or referring doctor, and (8) completing peer review tasks. A certain group (e.g., an array) of user software activities may be clustered in association with each of these objectives. These user software activities are not always performed in the same order by any one user or various users (in one or more job roles), but the product requirements generator 110 uses AI to derive the associations between user software activities and objectives and to simulate various sequential user software activities that may be classified with one or more objectives.

The test generator 120 automatically generates a test plan (i.e., a test operation sequence or a set of test operation sequences) and, optionally, executes the test operation sequence or the set of test operation sequences based on the information provided by the product requirements generator 110 and/or the inputs 140.

In certain embodiments, software is provided for testing, along with the job roles that need to be tested, and the range in number of simultaneous users in each job role (and optionally, per level of expertise or experience in each job role). In certain embodiments that receive input 140, the software provider completes a worksheet listing the available job roles, objectives per job role, and provides lists of the various user software activities that are directly or indirectly tied to each of the objectives. In other embodiments, the product requirements generator 110 automatically creates a table of user software activities for each job role and each objective. The automatically generated table may be manually edited.

In certain embodiments, the test generator 120 automatically generates test operation sequences 160 (e.g., in the English language) per each job role and objective. In certain additional embodiments, the test generator 120 automatically executes one or more test operation sequences consisting of simulated user software activities in various sequences that are associated with each objective. In this manner, the test generator 120 simulates an environment in which different users (e.g., users unfamiliar with the software and users familiar with the software) are simultaneously attempting to accomplish various objectives by exploring various sequences of user software activities.

The test generator 120 also generates the performance reports 170 on the results of the user software activities, such as whether the objectives were accomplished, how successfully the objectives were accomplished with the least activity or shortest time, system failures, crashes, timings, etc.

In certain embodiments, the test requirements generator 110 and the test generator 120 may model the user software activities of a user logged into a computer as a time sequence of user software activities. In certain embodiments, the user software activities may be nodes of a graph of user software activities. In a time sequence of user software activities, each user software activity of the user has a relationship with one or more prior user software activities. In a graph, nodes representing a sequence of user software activities along a time line may be used to determine the user's objective with a variable length of activities.

In certain embodiments, the test requirements generator 110 uses a training set (e.g., generated by a Quality Assurance team member) of sequences of user software activities with the objectives by job role. The test engine driver 150 may use a Recurrent Neural Network (RNN) 132 to predict the user's objectives by considering the prior relevant user software activities. Once the RNN is trained using the training set, the RNN 132 accepts new user software activity logs of arbitrary length as input and outputs user software activities corresponding to specific job roles and objectives. In this manner, the RNN 132 automatically determines the subsequences of user software activities corresponding to specific job roles and objectives. With certain embodiments, in addition to learning from the user software activity logs, the test requirements generator 110 may also track user software activities (i.e., tracking activities by the user in operating the software) to gain additional information on user software activities.

In certain embodiments, to generate the list of requirements per job role for each site, the RNN classifies job roles and objectives from labeled user software activity logs generated during live use of the software by the user. Then, the frequently performed objectives for each job role may be designated as the site-specific requirements for that job role. This may also be used to determine overlap between the job roles and objectives that are common to multiple job roles. The requirements may be designated as general requirements.

Figure 2:
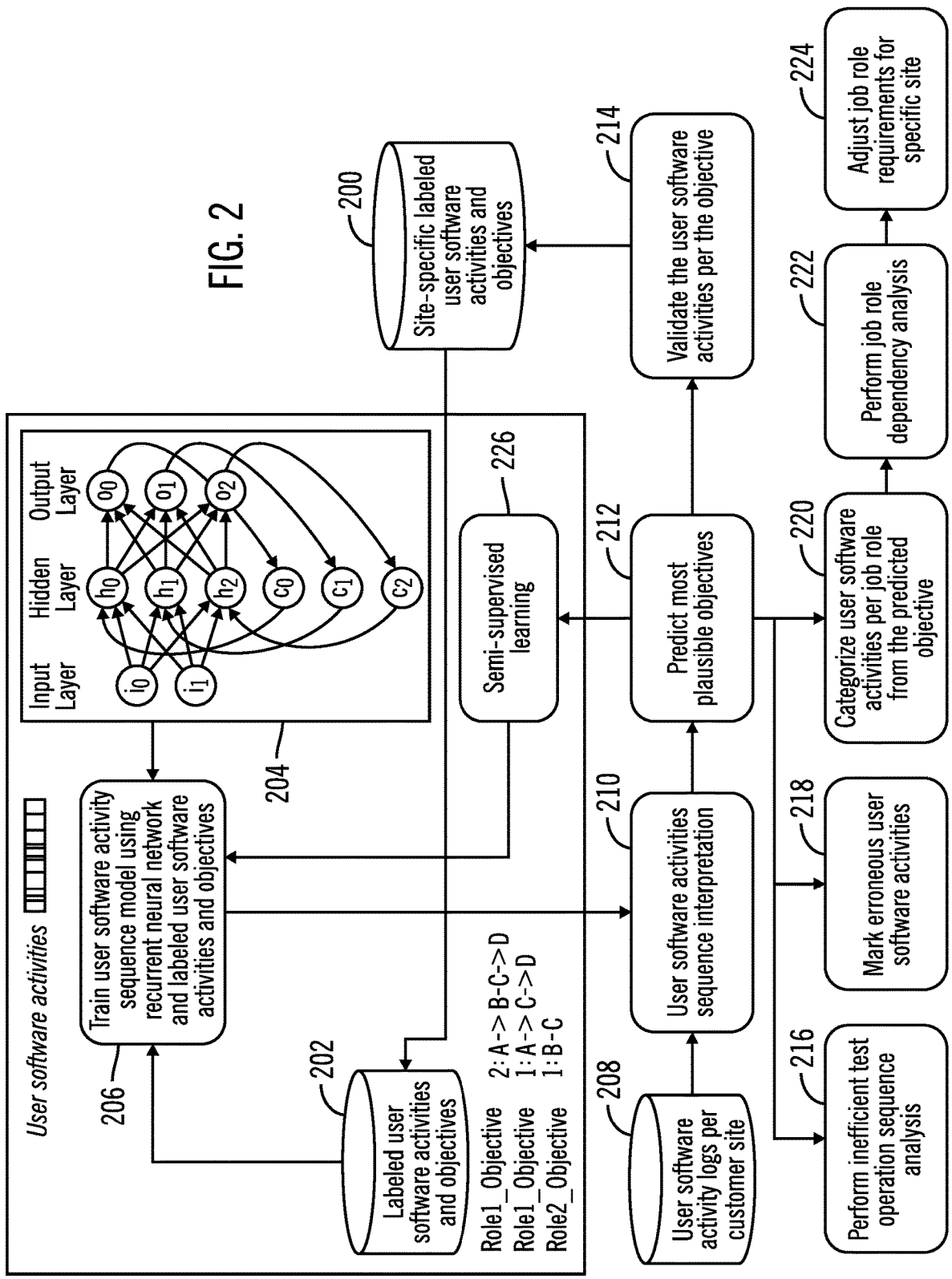
FIG. 2 illustrates training a user software activity sequence model using a Recurrent Neural Network (RNN) model in accordance with certain embodiments.

FIG. 2 illustrates training a user software activity sequence model using a Recurrent Neural Network (RNN) in accordance with certain embodiments. A data store 200 stores site-specific labeled user software activities and objectives. Different sites (e.g., different hospitals) may have different job roles. Site-specific may be described as referring to a particular site having particular job roles. For example, different hospitals and clinics may have different job roles or allow different privileges to each job role. With embodiments, the training data includes user software activities labeled according to the objectives for those user software activities. The site-specific labeled user software activities and objectives are routed from that site's data store 200 to a datastore 202 that stores the labeled user software activities and objectives. A RNN 204 has an input layer, a hidden layer, and an output layer. In block 206, the product requirement generator 110 trains a user software activity sequence model using the RNN 204 and the labeled user software activities and objectives from the data store 202. The user software activity sequence model is a model that is used to predict job roles and objectives based on the user software activities.

The training (block 206) includes user software activity sequence interpretation (block 210), predicting the most plausible objectives (block 212), and validating the user software activities per objective (block 214).

The user software activity sequence interpretation (block 210) receives user software activity logs per customer site from data store 208.

The predicted objectives are used for semi-supervised learning (block 226), which is used to further train the user software activity sequence model (block 206). The validated user software activities per objective are stored in data store 200. That is, with embodiments, the site-specific labeled user software activities and objectives in data store 200 are generated from the user software activity logs per customer site from data store 208.

The predicting of the most plausible objectives (block 212) includes performing inefficient test operation sequence analysis (time analysis from the user software activity sequence model) (block 216), marking erroneous user software activities (block 218), categorizing user software activities per job role from the predicted objectives (block 220), performing job role dependency analysis (overlapping metrics) (block 222), and adjusting job role requirements for the specific site (block 224).

With reference to block 218, sometimes the activities by the user for a certain objective may include mistakes or unnecessary activities, and the software activity sequence model learns these mistakes or unnecessary activities so that the software activity sequence model incorporates these mistakes or unnecessary activities into the software testing, instead of just assuming that the user will always perform activities in the software manufacturer's intended way.

With reference to block 222, subsets of objectives that are common to multiple types of users are determined and may become general requirements.

With reference to block 224, the test requirements generator 110 may be trained on data from multiple sites and is able produce requirements for each job role specific to each site.

Once the RNN model is trained, the test generator 120 generates a test operation sequence. The test generator 120 receives as input a set of recorded sequences of user software activities, each labeled with the job role and objective. Optionally, some of the sequences of user software activities may not successfully achieve the objective, corresponding to errors made by the user.

Although an RNN model is used in certain embodiments, in other embodiments other machine learning classifiers may be used (e.g., temporal convolution network, Hidden Markov Model, etc.).

The test generator 120 trains a Generative Adversarial Network (GAN) 134 to generate test operation sequences, which are sequences of user software activities that each job role would likely take when trying to achieve each objective. The GAN 134 consists of two neural networks: 1) the discriminator neural network, which is trained to recognize true examples of likely activities of a user of role A trying to accomplish objectives, and 2) the generator neural network, which generates synthetic user software activities (i.e., examples of user software activities when using software) to test the discriminator neural network.

Once the discriminator neural network is unable to distinguish synthetic user software activities from real user software activities, the test generator 120 uses the generator neural network of the GAN 134 to create sample test operation sequences for each job role and objective pair.

Figure 3:
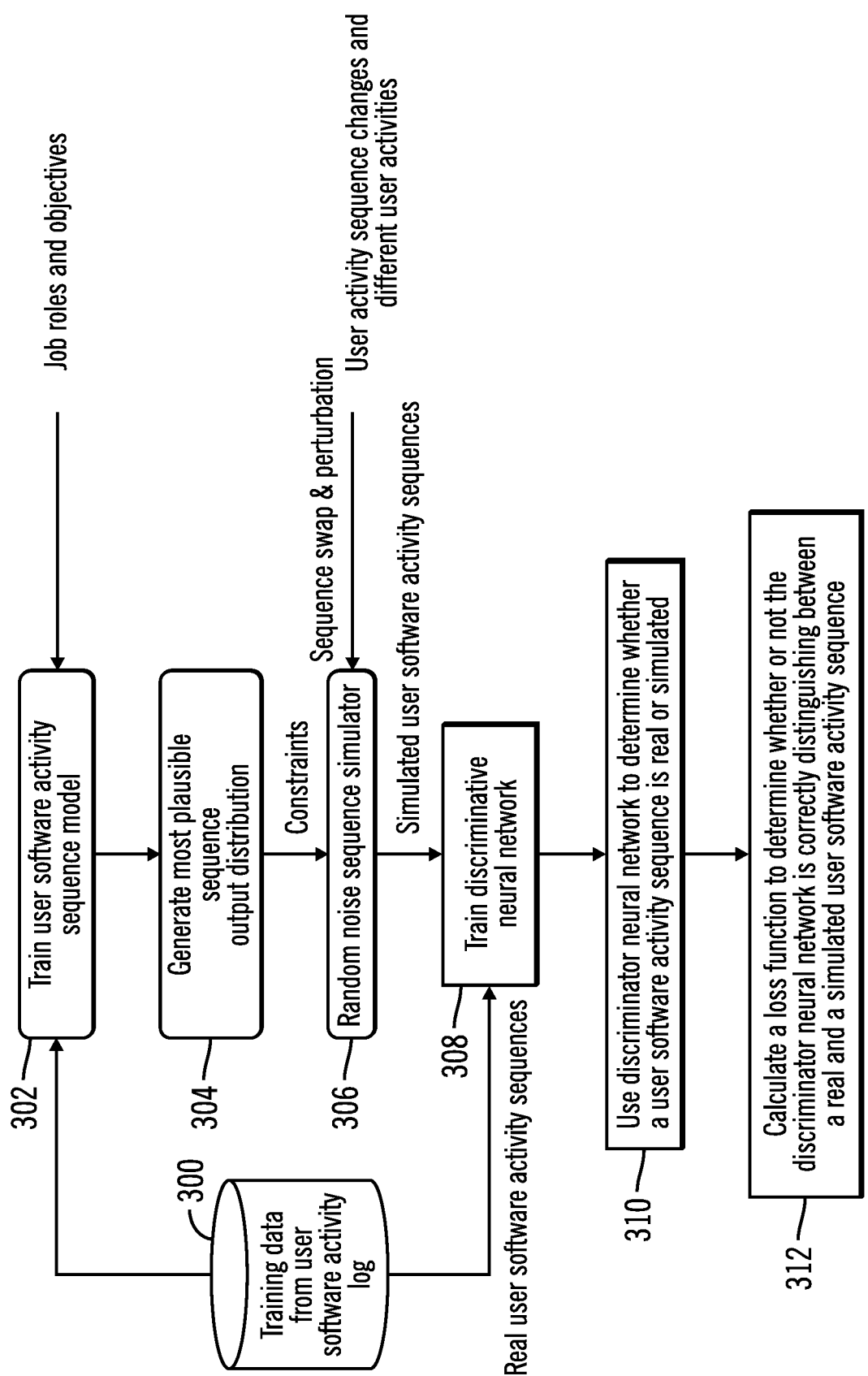
FIG. 3 illustrates, in a flowchart, operations for generating a test operation sequence in accordance with certain embodiments.

FIG. 3 illustrates, in a flowchart, operations for generating a test operation sequence in accordance with certain embodiments. In block 302, the test generator 120 trains a user software activity sequence model with training data from a user software activity log (from data store 300) and with job roles and objectives. In block 304, the test generator 120 generates the most plausible sequence output distribution. In block 306, the test generator 120 uses constraints, user activity sequence changes, and different user activities for a random noise sequence simulator. According to the analysis of erroneous user software activities (block 218 of FIG. 2), random spurious actions that do not lead to the desired objective may be introduced into the generated test operation sequences to simulate a real user. In block 308, the test generator 120 trains the discriminative model with simulated user activity sequences and real user activity sequences. In block 310, the discriminator neural network of the GAN takes a user software activity sequence that is either from a real user log or that was generated by the generator neural network of the GAN, and tries to determine whether it is real or simulated ("fake"). The generator neural network training is completed when the discriminator neural network cannot do better than a random guess in distinguishing real from simulated. In block 312, a loss function that is calculated to determine whether or not the discriminator neural network is correctly distinguishing real and simulated user software activity sequences. The discriminator neural network tries to reduce this loss to zero, which means that it does not make a mistake. The generator neural network is trying to prevent that from happening. Once the discriminator neural network is trained, the generator neural network generates test operation sequences.

Figure 4:
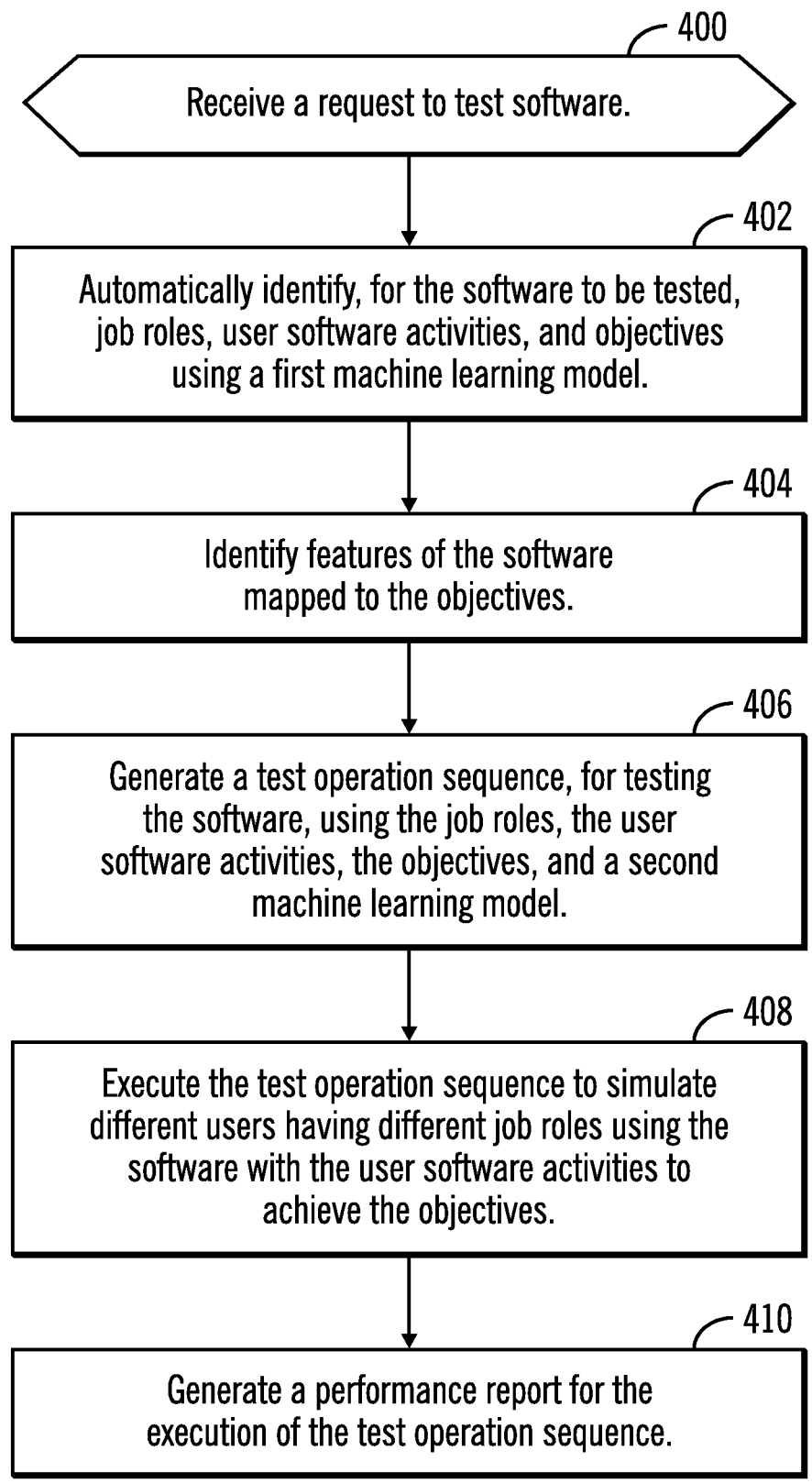
FIG. 4 illustrates, in a flowchart, operations for executing a test operation sequence in accordance with certain embodiments.

FIG. 4 illustrates, in a flowchart, operations for executing a test operation sequence in accordance with certain embodiments. Control begins at block 400 with the test engine driver 105 receiving a request to test software. In block 402, the product requirements generator 110 of the test engine driver 105 automatically identifies job roles, user software activities for software to be tested, and objectives using a first machine learning model. In block 404, the product requirements generator 110 of the test engine driver 105 identifies features of the software mapped to the objectives. In certain embodiments, the features of the software are found in a requirements document as a list of everything that the user should be able to do with the software. These features correspond to the list of objectives that are learned for each job role.

In block 406, the test generator 120 of the test engine driver 105 generates a test operation sequence using the job roles, the user software activities, and the objectives to test the software and using a second machine learning model. In block 408, the test generator 120 of the test engine driver 105 executes ("runs" or "performs") the test operation sequence to simulate different users having different job roles using the software with the user software activities to achieve the objectives. In block 410, the test generator 120 of the test engine driver 105 generates a performance report for the execution of the test operation sequence. Based on the performance report, the software may be revised to provide the user software activities to enable the objectives to be accomplished.

In certain embodiments, the test engine driver 105 receives as input one or more job roles, one or more sub-characteristics per role (e.g., levels of expertise), and objectives (per job role and/or sub-characteristic). The test engine driver 105 also receives software to be tested and software features of the software cross-indexed to each objective.

In certain embodiments, the test engine driver 105 outputs a simulated execution of the software by the desired number of users in various job roles, mimicking the group of potential user software activities directed toward achieving the objectives. In addition, the test engine driver 150 outputs a performance report on the results of the simulated execution of the software. The performance report may include any combination of: system crashes, time to achieve objectives, number of required inputs per objective, etc.

Certain embodiments identify user requirements for using software and determine a sequence of user activities (i.e., a test operation sequence) for testing the software. The software may be existing software or may be software that is to-be-developed software. Then, two or more job roles corresponding with two or more respective users are received. For each of the two or more job roles, one or more objectives to be accomplished when using the software are received. For each of the two or more respective users, user software activity data is received, where the user software activity data is obtained by monitoring the use of software by a user (where the software may be current, existing software that is to be replaced by the software to-be-developed). Optionally, for each of the two or more respective users, one or more characteristics of the user are received (e.g., is the user an expert). One or more user requirements per job role are determined by classifying the user software activity data according to the objective to be accomplished, where the classifying of the user software activity data is performed using the RNN. For each job role, two or more sequences of user software activities are generated for use of the software to be developed that are likely to be employed by a user to achieve each objective to be accomplished, where the generating of the sequences of user software activities is performed using a GAN. The software is tested using the generated sequences of user software activities as test operation sequences.

The GAN may include a generator neural network that generates synthetic sequences of user software activities for use of the software that are likely to be employed by a user to achieve each objective to be accomplished and a discriminator neural network that iteratively evaluates the synthetic sequences of user software activities generated by the generator neural network to determine whether a synthetic sequence of user software activities is accurate until the generator neural network is trained (in other words, until the discriminator neural network determines that each synthetic sequence of user software activities is accurate).

Embodiments attempt to anticipate and recreate the full scope of activities encountered in real use, rather than reflecting ideal (i.e., with no user errors) test operation sequences alone. This results in avoiding defects and usability issues in newly released software, which results in greater customer satisfaction, more likely adoption of future versions by the customer, and an improved company reputation.

Embodiments work well for enterprise software, by simulating simultaneous users with different job roles and levels of experience.

Certain embodiments use machine learning to automatically determine how the software is actually used and to generate job roles and test cases from logs of live software execution. That is, certain embodiments use machine learning to infer the requirements from the software's usage patterns, rather than requiring them as input. Embodiments also create test cases based on real usage patterns.

Figure 5:
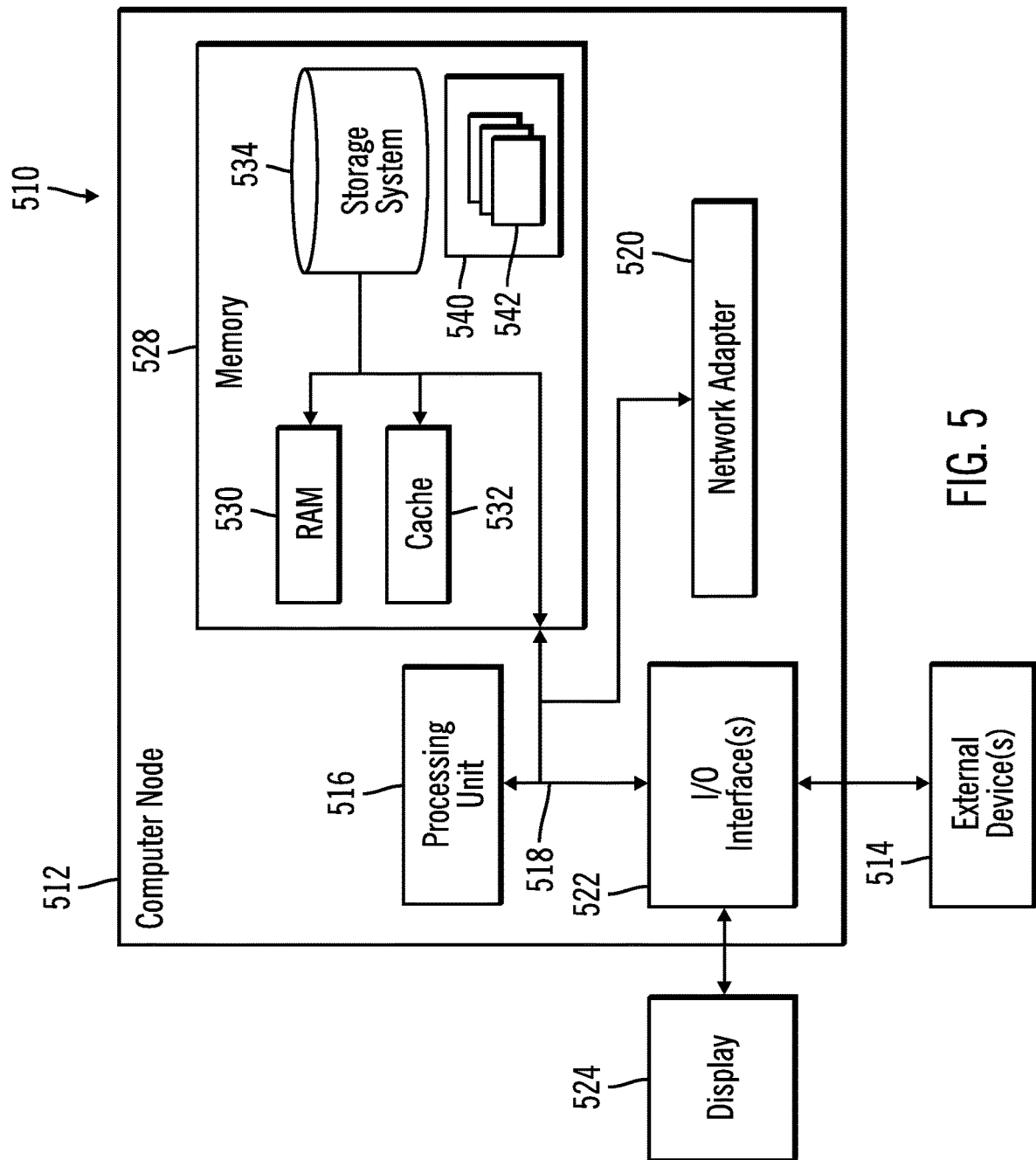
FIG. 5 illustrates a computing node in accordance with certain embodiments.

FIG. 5 illustrates a computing environment 510 in accordance with certain embodiments. In certain embodiments, the computing environment is a cloud computing environment. Referring to FIG. 5, computer node 512 is only one example of a suitable computing node and is not intended to suggest any limitation as to the scope of use or functionality of embodiments of the invention described herein. Regardless, computer node 512 is capable of being implemented and/or performing any of the functionality set forth hereinabove.

The computer node 512 may be a computer system, which is operational with numerous other general purpose or special purpose computing system environments or configurations. Examples of well-known computing systems, environments, and/or configurations that may be suitable for use with computer node 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 512 may be described in the general context of computer system executable instructions, such as program modules, being executed by a computer system. Generally, program modules may include routines, programs, objects, components, logic, data structures, and so on that perform particular tasks or implement particular abstract data types. Computer node 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer node 512 is shown in the form of a general-purpose computing device. The components of computer node 512 may include, but are not limited to, one or more processors or processing units 516, a system memory 528, and a bus 518 that couples various system components including system memory 528 to one or more processors or processing units 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 512 typically includes a variety of computer system readable media. Such media may be any available media that is accessible by computer node 512, and it includes both volatile and non-volatile media, removable and non-removable media.

System memory 528 can include computer system readable media in the form of volatile memory, such as random access memory (RAM) 530 and/or cache memory 532. Computer node 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, system memory 528 may include at least one program product having a set (e.g., at least one) of program modules that are configured to carry out the functions of embodiments of the invention.

Program/utility 540, having a set (at least one) of program modules 542, may be stored in system memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer node 512 may also communicate with one or more external devices 514 such as a keyboard, a pointing device, a display 524, etc.; one or more devices that enable a user to interact with computer node 512; and/or any devices (e.g., network card, modem, etc.) that enable computer node 512 to communicate with one or more other computing devices. Such communication can occur via Input/Output (I/O) interfaces 522. Still yet, computer node 512 can communicate with one or more networks such as a local area network (LAN), a general wide area network (WAN), and/or a public network (e.g., the Internet) via network adapter 520. As depicted, network adapter 520 communicates with the other components of computer node 512 via bus 518. It should be understood that although not shown, other hardware and/or software components could be used in conjunction with computer node 512. Examples, include, but are not limited to: microcode, device drivers, redundant processing units, external disk drive arrays, RAID systems, tape drives, and data archival storage systems, etc.

In certain embodiments, the computing device 100 has the architecture of computer node 512. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
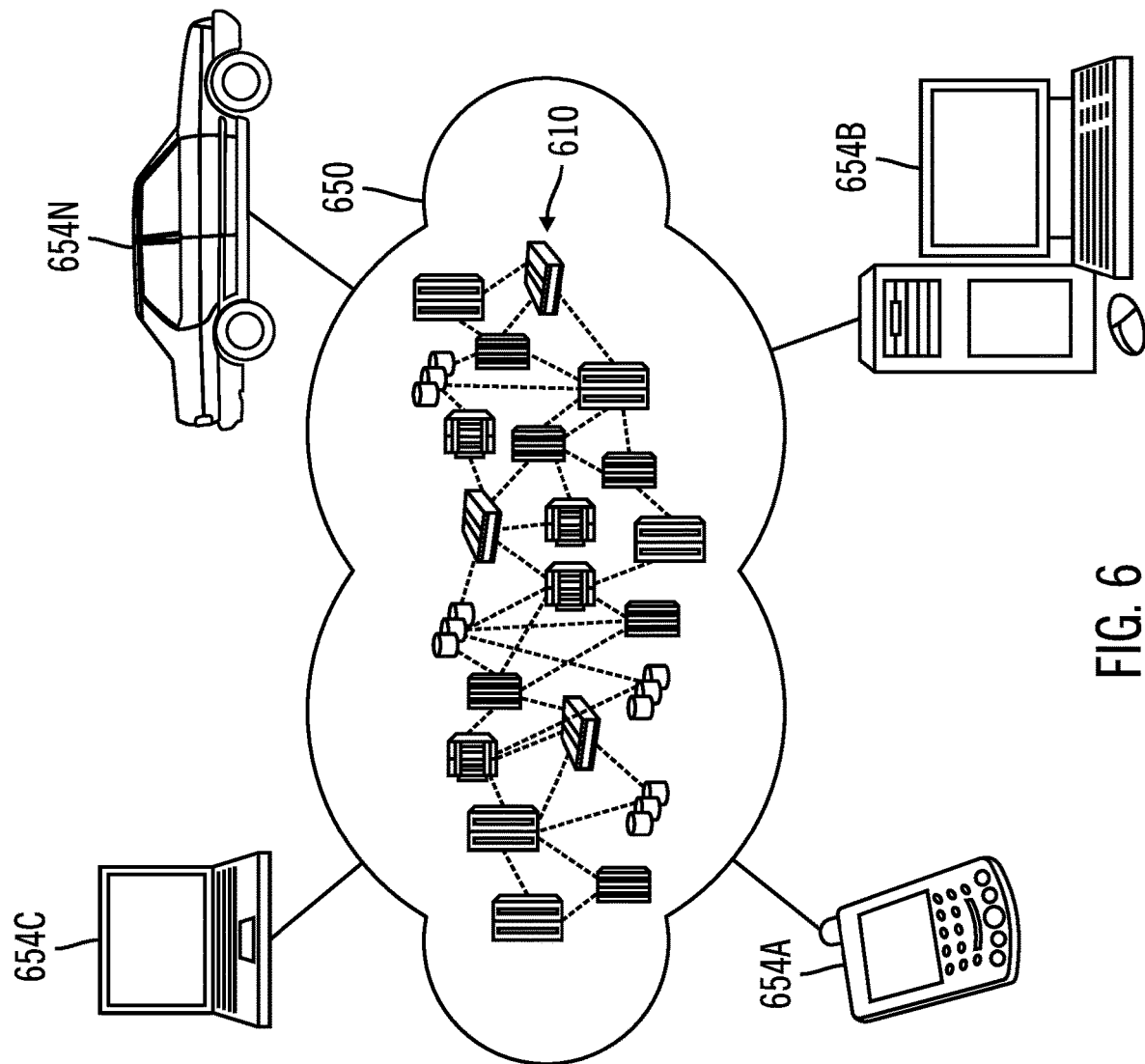
FIG. 6 illustrates a cloud computing environment in accordance with certain embodiments.

Referring now to FIG. 6, illustrative cloud computing environment 620 is depicted. As shown, cloud computing environment 620 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 620 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 620 can communicate with any type of computerized device over any type of network and/or network addressable connection (e.g., using a web browser).

Figure 7:
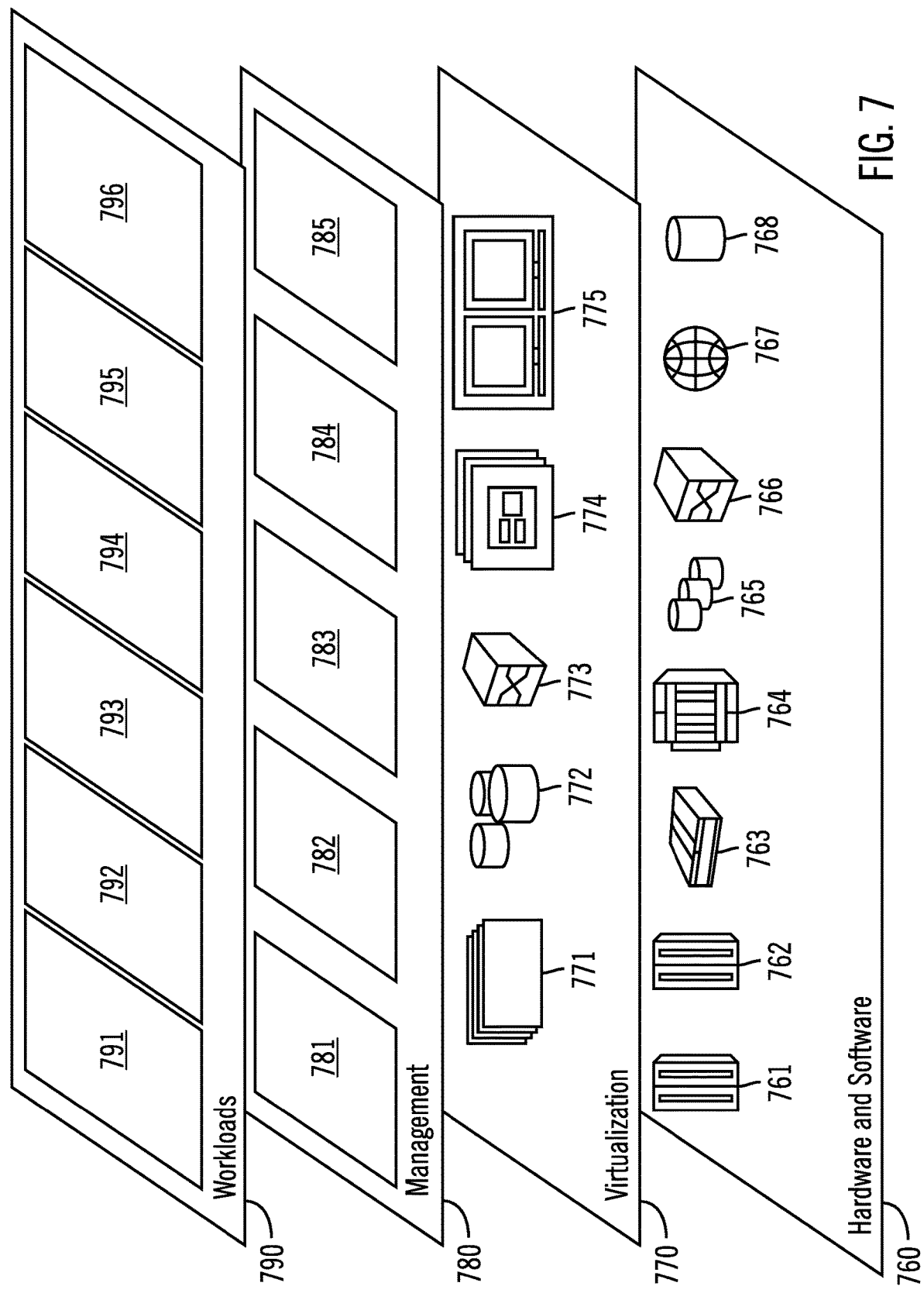
FIG. 7 illustrates abstraction model layers in accordance with certain embodiments.

Referring now to FIG. 7, a set of functional abstraction layers provided by cloud computing environment 620 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and automated software testing using simulated user personas 796.

Thus, in certain embodiments, software or a program, implementing automated software testing using simulated user personas in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
   receiving a request to test software;
   automatically identifying job roles, user software activities for the software to be tested, and objectives, wherein a software activity of the user software activities does not achieve a corresponding objective of the objectives;
   generating a test operation sequence using the job roles, the user software activities, and the objectives to test the software, wherein the test operation sequence tests the software activity that does not achieve the corresponding objective;
   executing the test operation sequence to simulate different users having different job roles using the software with the user software activities to achieve the objectives; and
   generating a performance report for the execution of the test operation sequence, wherein the software is revised based on the performance report to have the user software activity achieve the corresponding objective.

2. The computer-implemented method of claim 1, wherein a first machine learning model is a recurrent neural network and further comprising operations for:
   sending one or more user software activity logs to the first machine learning model; and
   receiving the job roles, the user software activities, and the objectives.

3. The computer-implemented method of claim 1, wherein the test operation sequence is generated by a second machine learning model that is a generative adversarial network.

4. The computer-implemented method of claim 1, further comprising operations for:
   monitoring a plurality of users using the software to identify the job roles, the user software activities for the software to be tested, and the objectives.

5. The computer-implemented method of claim 1, wherein a Software as a Service (SaaS) is configured to perform the operations of the method.

6. The computer-implemented method of claim 1, wherein the performance report indicates whether the objectives were accomplished and how successfully the objectives were accomplished with one of least activity and shortest time.

7. A computer program product, the computer program product comprising a computer readable storage medium having program code embodied therewith, the program code executable by at least one processor to perform operations for:
   receiving a request to test software;
   automatically identifying job roles, user software activities for the software to be tested, and objectives, wherein a software activity of the user software activities does not achieve a corresponding objective of the objectives;
   generating a test operation sequence using the job roles, the user software activities, and the objectives to test the software, wherein the test operation sequence tests the software activity that does not achieve the corresponding objective;
   executing the test operation sequence to simulate different users having different job roles using the software with the user software activities to achieve the objectives; and
   generating a performance report for the execution of the test operation sequence, wherein the software is revised based on the performance report to have the user software activity achieve the corresponding objective.

8. The computer program product of claim 7, wherein a first machine learning model is a recurrent neural network and wherein the program code is executable by the at least one processor to perform operations for:
   sending one or more user software activity logs to the first machine learning model; and
   receiving the job roles, the user software activities, and the objectives.

9. The computer program product of claim 7, wherein the test operation sequence is generated by a second machine learning model that is a generative adversarial network.

10. The computer program product of claim 7, and wherein the program code is executable by the at least one processor to perform operations for:
 monitoring a plurality of users using the software to identify the job roles, the user software activities for the software to be tested, and the objectives.

11. The computer program product of claim 7, wherein a Software as a Service (SaaS) is configured to perform the operations of the computer program product.

12. The computer program product of claim 7, wherein the performance report indicates whether the objectives were accomplished and how successfully the objectives were accomplished with one of least activity and shortest time.

13. A computer system, comprising:
 one or more processors, one or more computer-readable memories and one or more computer-readable, tangible storage devices; and
 program instructions, stored on at least one of the one or more computer-readable, tangible storage devices for execution by at least one of the one or more processors via at least one of the one or more computer-readable memories, to perform operations comprising:
 receiving a request to test software;
 automatically identifying job roles, user software activities for the software to be tested, and objectives, wherein a software activity of the user software activities does not achieve a corresponding objective of the objectives;
 generating a test operation sequence using the job roles, the user software activities, and the objectives to test the software, wherein the test operation sequence tests the software activity that does not achieve the corresponding objective;
 executing the test operation sequence to simulate different users having different job roles using the software with the user software activities to achieve the objectives; and
 generating a performance report for the execution of the test operation sequence, wherein the software is revised based on the performance report to have the user software activity achieve the corresponding objective.

14. The computer system of claim 13, wherein a first machine learning model is a recurrent neural network and wherein the operations further comprise:
 sending one or more user software activity logs to the first machine learning model; and
 receiving the job roles, the user software activities, and the objectives.

15. The computer system of claim 13, wherein the test operation sequence is generated by a second machine learning model that is a generative adversarial network.

16. The computer system of claim 13, wherein the operations further comprise:
 monitoring a plurality of users using the software to identify the job roles, the user software activities for the software to be tested, and the objectives.

17. The computer system of claim 13, wherein a Software as a Service (SaaS) is configured to perform the operations of the computer system.

18. The computer system of claim 13, wherein the performance report indicates whether the objectives were accomplished and how successfully the objectives were accomplished with one of least activity and shortest time.

\* \* \* \* \*